(12) United States Patent
Pugliese

(10) Patent No.: US 11,419,450 B2
(45) Date of Patent: Aug. 23, 2022

(54) LIQUID CONTAINER, BEVERAGE PRODUCTION SYSTEM AND METHOD FOR DETECTING ONE OR A PLURALITY OF LIQUID FILLING LEVELS OF A CONTAINER

(71) Applicant: SOCIETE DES PRODUITS NESTLE S.A., Vevey (CH)

(72) Inventor: Alexandre Pugliese, Paudex (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/648,712

(22) PCT Filed: Sep. 6, 2018

(86) PCT No.: PCT/EP2018/073998
§ 371 (c)(1),
(2) Date: Mar. 19, 2020

(87) PCT Pub. No.: WO2019/057506
PCT Pub. Date: Mar. 28, 2019

(65) Prior Publication Data
US 2020/0214493 A1    Jul. 9, 2020

(30) Foreign Application Priority Data

Sep. 19, 2017   (EP) .................................... 17191768

(51) Int. Cl.
*A47J 31/56*      (2006.01)
*A47J 31/52*      (2006.01)
(Continued)

(52) U.S. Cl.
CPC ................ *A47J 31/56* (2013.01); *A23L 2/00* (2013.01); *A47J 31/41* (2013.01); *A47J 31/525* (2018.08); *A47J 2203/00* (2013.01)

(58) Field of Classification Search
CPC .... A47J 2203/00; A47J 36/2444; A47J 36/26; A47J 36/245; A47J 36/246; A47J 36/247;
(Continued)

(56) References Cited

U.S. PATENT DOCUMENTS 4,476,719 A * 10/1984 Millar ....................... G01F 1/00
                                                          73/200
6,163,248 A    12/2000 Paek et al.
(Continued)

FOREIGN PATENT DOCUMENTS

CN          101730494 A       6/2010
CN          102196754 A       9/2011
(Continued)

OTHER PUBLICATIONS

"What is Mylar?" Sorbent Systems https://web.archive.org/web/20130304143806/https://www.sorbentsystems.com/mylarinfo.html (Year: 2013).*

(Continued)

*Primary Examiner* — Drew E Becker
*Assistant Examiner* — Austin Parker Taylor
(74) *Attorney, Agent, or Firm* — K&L Gates LLP

(57) ABSTRACT

The invention relates to a container (2) for receiving a liquid comprising a thin film capacitive sensor (100) comprising a level sensor for detecting the liquid filling level of the container (2) over time, wherein the sensor (100) further comprises a settable device allowing setting one or more desired liquid filling levels of the container (2), of the same or of different liquids. Preferably, the settable device is configured as a touch screen, arranged in the external layer of the sensor (100). The invention further relates to a beverage production system (S) comprising a beverage production machine (1) having a beverage production unit (10) for preparing and dispensing a beverage and a control
(Continued)

unit (50) for controlling a beverage production of the beverage production unit (10), and a container (2) as the one described. Yet further, the invention relates to a method for setting one or a plurality of liquid filling levels of a container (2).

7 Claims, 4 Drawing Sheets

(51) Int. Cl.
*A23L 2/00* (2006.01)
*A47J 31/41* (2006.01)

(58) Field of Classification Search
CPC ............ A47J 31/56; A47J 31/525–5255; A47J 31/4457; A47J 31/4458; A47J 31/057–0576; A47J 31/00; A47J 31/02; A47J 31/40–407; A47J 31/44; A47J 31/46; A47J 31/461; A47J 31/52–5255; A47G 19/12; A47G 19/20; A47G 19/22; A23L 2/00; A23L 2/52; A23F 5/00; C12G 3/04
USPC ............................ 426/231; 73/861.29 R–334
See application file for complete search history.

(56) References Cited

U.S. PATENT DOCUMENTS

| | | | | |
|---|---|---|---|---|
| 8,210,093 | B2* | 7/2012 | Knepler | A47J 31/402 99/280 |
| 2006/0277992 | A1* | 12/2006 | Calabrese | G01F 23/266 73/304 R |
| 2007/0193653 | A1* | 8/2007 | Gagliano | B67D 1/0855 141/256 |
| 2007/0236469 | A1* | 10/2007 | Woolley | G01F 23/261 345/173 |
| 2009/0291187 | A1* | 11/2009 | Wild | A23L 29/262 426/573 |
| 2010/0170916 | A1* | 7/2010 | Segers | B67D 1/0888 222/1 |
| 2011/0108570 | A1* | 5/2011 | Jarisch | A47J 31/40 99/453 |
| 2014/0202591 | A1* | 7/2014 | Schnyder | A47J 31/4403 141/95 |
| 2014/0293537 | A1* | 10/2014 | Chen | G06F 1/1643 361/679.55 |
| 2015/0013546 | A1* | 1/2015 | Kastor | A47J 31/061 99/300 |
| 2015/0366383 | A1* | 12/2015 | Raunio | G06F 3/0346 345/156 |
| 2016/0114301 | A1* | 4/2016 | Jablonski | B01F 15/0408 426/231 |
| 2016/0235243 | A1* | 8/2016 | Grassia | A47J 31/4489 |
| 2017/0156540 | A1* | 6/2017 | Wheatley | A47J 31/521 |

FOREIGN PATENT DOCUMENTS

| | | | | |
|---|---|---|---|---|
| CN | 102667662 | A | | 9/2012 |
| CN | 103519639 | A | | 1/2014 |
| CN | 105228943 | A | | 1/2016 |
| GB | 2470472 | A | * 11/2010 | ............ A47J 27/21 |
| JP | H02269693 | A | * 11/1990 | |
| KR | 20110120849 | A | * 11/2011 | |
| TW | M516700 | U | | 2/2016 |
| WO | WO-2016025992 | A1 | * 2/2016 | ............ A47J 31/106 |
| WO | WO-2016169778 | A1 | * 10/2016 | ............ A47J 31/41 |
| WO | WO-2017039063 | A1 | * 3/2017 | ......... A47G 19/2227 |
| WO | 2017149049 | | | 9/2017 |

OTHER PUBLICATIONS

TechTarget Contributor "What is dielectric material?" WhatIs.com Nov. 2010 https://whatis.techtarget.com/definition/dielectric-material (Year: 2010).*
Chinese Office Action for Chinese Appl No. 201880057335.3 dated Aug. 3, 2021.

* cited by examiner

LIQUID CONTAINER, BEVERAGE PRODUCTION SYSTEM AND METHOD FOR DETECTING ONE OR A PLURALITY OF LIQUID FILLING LEVELS OF A CONTAINER

CROSS REFERENCE TO RELATED APPLICATIONS

The present application is a National Stage of International Application No. PCT/EP2018/073998, filed on Sep. 6, 2018, which claims priority to European Patent Application No. 17191768.5, filed on Sep. 19, 2017, the entire contents of which are being incorporated herein by reference.

FIELD OF THE INVENTION

The present invention relates to a container for receiving a liquid, and to a beverage production system comprising a beverage production machine and such a container. Further, the invention relates to a method for setting one or a plurality of liquid filling levels of a container, when the container is associated with a beverage production machine.

BACKGROUND OF THE INVENTION

Containers for receiving a liquid for corresponding beverage production machines are known in the prior art. Such containers can be a water tank to be attached to or associated with a corresponding beverage production machine to provide and supply a liquid—like water—for allowing the production of a beverage with the machine. The respective beverage production machines comprise a beverage production unit for preparing and dispensing a beverage by using the liquid from the liquid container. These beverage production units can, for instance, be designed to receive a capsule containing a food product to be produced/extracted—like coffee or tea—using the liquid provided by the liquid container (e.g. water tank). Thereby, the food ingredients (e.g. a beverage ingredient like coffee powder or tea leafs) provided in the capsule are made to interact with said liquid provided, e.g. under pressure, to the capsule in order to form a desired (liquid) comestible/beverage that is then made to leave the capsule and the beverage production unit.

The container for receiving a liquid can also be a drinking vessel (typically like a cup or a mug) for receiving the beverage which has been prepared and dispensed by the beverage production unit of the beverage production machine.

For detecting the liquid filling level of the water tank, mechanical liquid level measurement means are usually used. Such liquid level measurement means can, for instance, be liquid level floats which may be combined with visual means reflecting the actual filling level of the respective tank.

For detecting the flow rate of the liquid delivered from the liquid tank to the beverage production machine, flowmeters and particularly mechanical flowmeters are often used in present beverage production machines. These flowmeters are usually used for detecting the liquid amount being delivered to the beverage production unit from which the progress of an actual beverage production and/or the condition of the beverage production machine can be derived. For instance, a reduced flow rate may be an indication for liquid lines of the beverage production machine being clogged, e.g., due to scale.

However, a detection means for the liquid filling level of a drinking vessel, such as a cup or a mug, for example, in connection with a corresponding beverage production machine, is as such not yet known from the prior art.

Liquid level detection as described before can be of high interest for the user while today most of the machines are not equipped with such a function for economic and/or aesthetic reasons. Moreover, most of the liquid level detection means are so-called liquid level floats which are bulky and space consuming while at the same time prone to catching due to a usually simple mechanical layout of the respective guidance of the floater elements. Additionally, machine integrated flowmeters can at most indirectly measure the filling level of a cup/mug which is associated with a beverage production machine.

It is neither known in the state of the art detection means allowing to know several liquid filling levels of a drinking vessel, in order for example, to provide different volumes or levels of different liquids to prepare a certain recipe or the like.

With the smart container of the invention, no HMI nor any flowmeter is needed in the beverage dispensing machine anymore, as these functions are integrated in the container itself. This allows the use of simple beverage dispensing machines and also to upgrade with new functions low cost or old and standard beverage dispensing machines, simply by allowing the connection of these machines with a smart container as per the present invention. At present, the known automatic beverage dispensing systems in the state of the art need to use a HMI and typically also a flowmeter to start the preparation of a beverage and to select the required volume of such beverage.

The present invention seeks to address the above-described problems and provide the desired solutions, as mentioned. The invention also aims at other objects and particularly the solution of other problems as will appear in the rest of the present description.

SUMMARY OF THE INVENTION

According to a first aspect, the invention relates to a container for receiving a liquid comprising a thin film capacitive sensor comprising a level sensor for detecting the liquid filling level of the container over time: the sensor further comprises a settable device allowing setting one or more desired liquid filling levels of the container, of the same or of different liquids.

Preferably, the settable device is configured as a touch screen, arranged in the external layer of the sensor. Typically, the sensor is transparent and preferably colourless.

According to a preferred embodiment of the invention, the sensor comprises a conducting oxide deposition on a substrate: the conducting oxide is preferably a transparent conducting oxide (TCO) like indium tin oxide (ITO), aluminium zinc oxide (AZO), gallium zinc oxide (GZO), indium zinc oxide (IZO), indium cadmium oxide (ICO), antimony tin oxide (ATO), and fluorine tin oxide (FTO). The substrate is preferably made of glass or a polymer, more preferably a transparent glass or polymer like Polyethylene Terephthalate (PET).

Preferably, the thin film capacitive sensor of the invention is configured flexible and allows substantially adopting the external shape of the container.

According to a preferred embodiment, the level sensor and the settable device are electrically isolated from each other configured in such a way that their measurements are not influenced.

Typically, the container of the invention comprises a double wall where the sensor is embedded.

In the container of the invention, the sensor preferably at least partially extends between a bottom and a top portion of the container, preferably from a bottom of the container towards a top of the container, and most preferably at least up to a maximum liquid filling level of the container.

Preferably, the sensor in the container of the invention comprises a wireless connection portion like an RFID tag, for connecting the sensor to associated parts, e.g. to a control unit of a beverage production machine, for a measurement operation.

Typically, the sensor in the container according to the invention is provided along the outer surface or at least partially within a sidewall of the container. In a preferred embodiment, the container is a drinking vessel, like a cup or a mug.

Preferably, the sensor is attached, e.g. glued or welded, onto the container according to the invention: the container preferably comprises an adhesive area for attaching the sensor onto the container, which adhesive area can be selectively provided with a releasable sealing cover when the sensor is not attached to the container.

In a preferred embodiment of the invention, the container is made of a dielectric material.

According to a second aspect, the invention relates to a beverage production system comprising a beverage production machine having a beverage production unit for preparing and dispensing a beverage and a control unit for controlling a beverage production of the beverage production unit, and a container as the one described before. The sensor of the container is connected with the control unit, e.g. via an electrical contact or a wireless transmission means of the machine, when the container is associated with the machine. The control unit is configured to control the beverage production based on the liquid filling level of the container over time detected by the level sensor and on the desired liquid filling levels of the container set by the settable device of one or more different liquids.

Preferably, in the beverage production system according to the invention, the wireless transmission means is an RFID reader to be connected with a wireless connection portion, like an RFID tag, of the container.

Yet according to a third aspect, the invention further relates to a method for setting one or a plurality of liquid filling levels of a container, comprising the steps of: providing a beverage production system as the one previously described, associating the container with the beverage production machine such that the sensor of the container is connected with the control unit, e.g. via the electrical contact or the wireless transmission means of the machine, and controlling the beverage production based on the liquid filling level of the container over time detected by the level sensor and on the desired liquid filling level or levels of the container set by the settable device, of the same or different liquids.

Preferably, the control unit controls the beverage production based on the flow rate derived from the change of the liquid filling level of the container detected by the sensor during the beverage production to reach the set level of liquid in the container, for each of the levels of liquid set through the settable device, for the same or for different liquids.

BRIEF DESCRIPTION OF THE DRAWINGS

Additional features and advantages of the present invention are described in, and will be apparent from, the description of the presently preferred embodiments which are set out below with reference to the drawings in which:

FIG. 3b shows a detailed frontal sectional view of a liquid container according to the present invention, as represented in FIG. 3a.

DETAILED DESCRIPTION OF THE INVENTION

Figure 1:
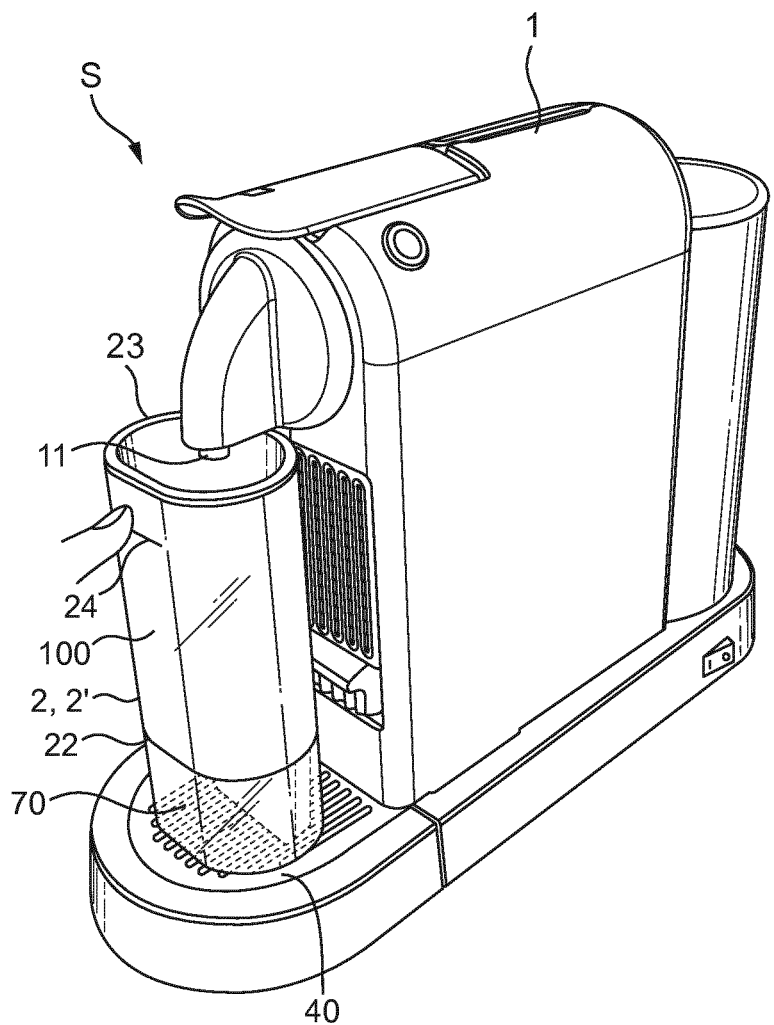
FIG. 1 shows a perspective view of a representative example of a beverage production system according to the present invention.

Thin film technology is commonly known in the prior art. A thin film is a layer of material ranging from fractions of a nanometer to several micrometers in thickness. For applying a thin film, a common technique is the so-called physical vapor deposition (PVD) covering a variety of vacuum deposition methods used for producing thin films. Physical vapor deposition uses physical processes like heating or sputtering to produce a vapor of material which is then deposited on a substrate.

Using a thin film capacitive sensor for detecting the liquid filling level of a corresponding container for receiving a liquid allows for an affordable and reliable sensor solution which can be easily provided to commonly known liquid containers while at the same time having no or only minor effect on the design (aesthetic) of the respective container due to its small dimensions particularly with respect to its thickness and preferably also its transparency.

Moreover, roll-to-roll processing (R2R) can be used by the production of thin film sensors which provides a good solution for cost optimization with respect to processes required for commonly known beverage production machine sensing elements like flowmeters and level floats.

The sensor of the present invention may be transparent and is preferably colorless. Using a transparent/colorless thin film capacitive sensor results in the sensor being more or less invisible thus not affecting the aesthetic of the container to which the sensor is applied.

In a preferred embodiment, the sensor is provided along the outer surface or at least partially within a side wall of the container. In the former embodiment, the sensor can be easily provided to the container, e.g., in the course of retrofitting.

In the latter embodiment, the sensor can be easily integrated and thus preferably hidden within the container walls when producing the container, e.g., by way of injection molding. Preferably, according to the invention, the container is a drinking vessel, like a cup or a mug, for receiving a beverage prepared by a beverage production machine.

In a preferred embodiment, the sensor can be attached onto the container, e.g. by being glued or welded. Therefore, the container may comprise an adhesive area for attaching the sensor onto the container. This adhesive area can be selectively provided with a releasable sealing cover when the sensor is not attached to the container to thus provide a protection film for the adhesive. The application onto the container can thus be easily done by peeling off the protection film and simply sticking the sensor onto the exposed adhesive area, i.e. onto the surface of the container to be equipped with the thin film capacitive sensor of the present invention.

In a preferred embodiment, the container is made of a dielectric material so that the thin film capacitive sensor can be used as one pole of a capacitor which can then be directly influenced by the liquid level inside the container forming the dielectric of the respective capacitor. The sensor can also be used as one pole of a capacitor being part of a corresponding beverage production machine. The capacitance measurement is preferably carried out like the detection of, for instance, a finger on a capacitive touch screen. In particular, a dedicated electronic—e.g. of the beverage production machine as described in the following—is able to monitor the changes in the capacity and thus to determine the liquid level of the container. Moreover, the thin film capacitive sensor of the present invention may also be used to detect the flow rate of liquid being supplied to the container which flow rate corresponds to the change of the liquid filling level of said liquid container over time. In other words, when the liquid filling level of the container changes, the capacity detected by the thin film capacitive sensor of the container changes as well. Based on the change of this capacity over time, the flow rate of the respective container from which liquid is discharged or to which liquid is supplied can be easily derived. Therefore, according to the invention, there is no need to have a flowmeter as in the known systems in the state of the art, as only the container itself can perform the same function.

In a preferred embodiment, the container may comprise a (mechanical) coding to allow for a defined positioning/orientation of the container in association with the corresponding beverage production machine so that the sensor will securely be connected, e.g. electrically or wirelessly connected, to this beverage production machine.

In a preferred embodiment, the container is further provided with an RFID tag for providing data with respect to the container (e.g. maximum volume, filling level, correlation between capacity and filling level) to a beverage production machine which comprises a corresponding reader for receiving the stored data from the RFID tag of the container.

Even if the term "beverage" is used herein, the invention is not limited to the production of beverages but may cover all kinds of (liquid) comestible production (machines/systems), e.g. for producing tea, coffee, soups, baby food and the like.

FIG. 1 shows a beverage production machine 1 associated to a container 2, configured as a drinking vessel (cup or mug) according to the present invention. The beverage production machine 1 and the liquid container 2 together form a beverage production system S according to the invention. The beverage production machine 1 can be any kind of beverage production machine for producing and dispensing a (liquid) comestible or beverage, such as a coffee machine for preparing coffee, e.g. from a capsule containing coffee powder, by extraction with a hot and preferably pressurized liquid (e.g. water) within a capsule receiving chamber.

The container 2 of the invention comprises a thin film capacitive sensor 100 which comprises a level sensor for detecting the liquid filling level of the container 2 over time and a settable device allowing setting one or more desired liquid filling levels of the container 2, of the same or of different liquids. For example, when the container 2 is placed and linked to the beverage production machine 1, a user can set a certain filling level desired for the beverage delivered by the machine 1. Typically, the settable device is configured as a touch screen arranged in the external layer of the sensor 100, so when a user typically touches the external part of the sensor 100, the consumer consequently sets the desired filling level in the container 2 at the end of the beverage dispensing. The level sensor in the container 2 will thus detect and measure the liquid filling level of the container 2 over time, so a signal to the system S will be sent in order to communicate that the desired filling level has been reached and so the beverage dispensing can be stopped.

The sensor 100 of the invention is further configured in such a way that its settable device allows the setting of one or more liquid filling levels, typically of different liquids. For example, when the beverage dispensing 1 can deliver different liquids, such as for example coffee and milk, or can perform different operations, such as for example milk foaming, the consumer can set a certain beverage recipe configuration in the container 2 by setting different filling levels of these different liquids (milk foam should be comprised and understood as a type of liquid, too), in order to personalise the beverage desired. As such, the consumer may set a first filling level (i.e. quantity) of coffee, then of milk and a third one of milk foam, for example. Other combinations are also possible, always depending on the type of machine 1 to which the container 2 is connected, so depending on the system S configured. This allows the connection of the container to an already existing machine to upgrade this machine and allow providing further functionalities of it, simply by adding the upgraded container 2, and always as long as the machine 1 allows its connection to this container 2, typically using a wireless connection.

As exemplified in FIG. 1, the container 2 will typically comprise a bottom part or volume 70 where the electronics 72, also comprising the wireless connections (typically Bluetooth or Wi-Fi), and also a battery 71 for the autonomous power supply to the container 2. The total liquid filling level of the container 2 (comprising the same liquid, as one setting from the user, or the addition of the plurality of liquid filling levels, also set by the user before the beginning of the preparation of the beverage) will not exceed the maximum filling level 24 of the container (typically this maximum level 24 is well below the top portion 23 of the liquid container 2.

Figure 2:
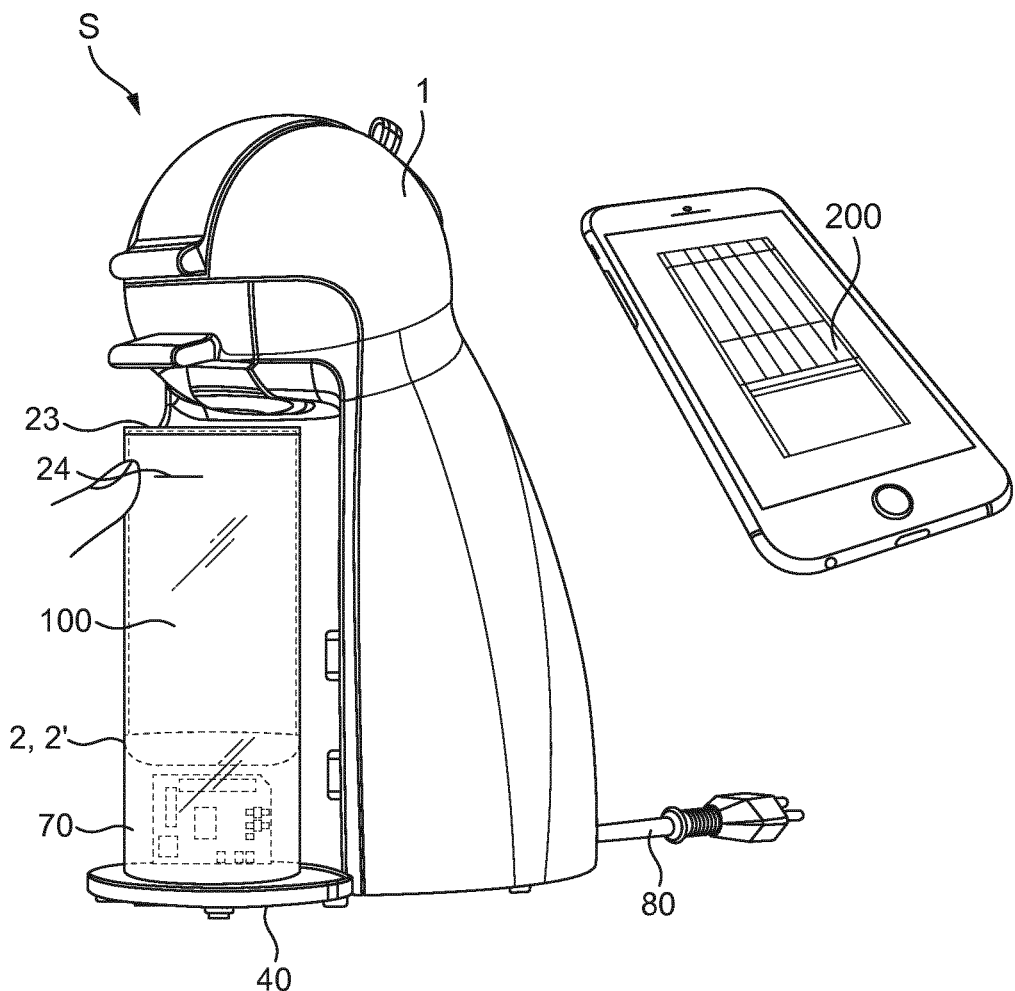
FIG. 2 shows a perspective view of another representative example of a beverage production system according to the present invention, also showing the connection of the liquid container of the invention with a portable device, such as a mobile phone.

A similar representation of the beverage production system S is shown in FIG. 2. A mobile phone 200 is also represented, which allows the user, once he has set one or more liquid filling levels to be reached in the container 2, to follow in the screen of this device the visualization level and flow rate of the liquid or the different liquids in the container 2. The mobile device 200 will connect to the container 2 by means of a wireless connection (typically, by Bluetooth or Wi-Fi). It is to be understood from the invention that the master element in the system S is the container 2: it is indeed this container which sets the desired liquid filling level or levels (the user sets them), which are sent to the machine 1 in order to prepare the beverage or the recipe. The machine will change liquid (e.g. milk, coffee), liquid treatment (e.g. milk foam) as per what was set by the user in the device 2 (i.e. the machine will act as a slave element of the container in the system conceived in the invention), and will also stop the dispensing as what it was set. The user will be able to monitor the development of the beverage dispensing and/or recipe by connecting a mobile device 200 to the container 2.

Figure 3A:
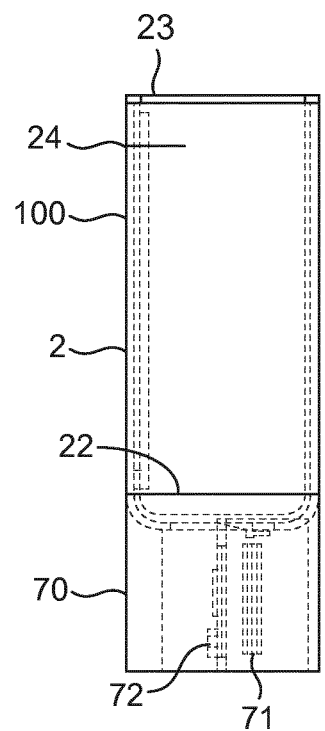
FIG. 3a shows a detailed side sectional view of a liquid container according to the present invention.
Figure 3B:
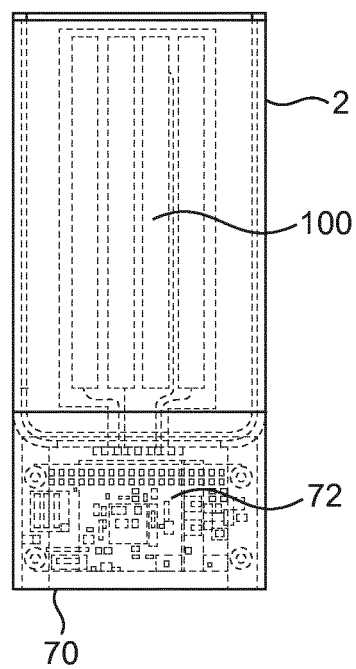

FIGS. 3a and 3b show a representative view of a container 2 according to the invention, as previously described, comprising a sensor 100 with the level sensor and the settable device, also showing the bottom part or volume 70 with the electronics 72 and the battery 71.

Figure 4:
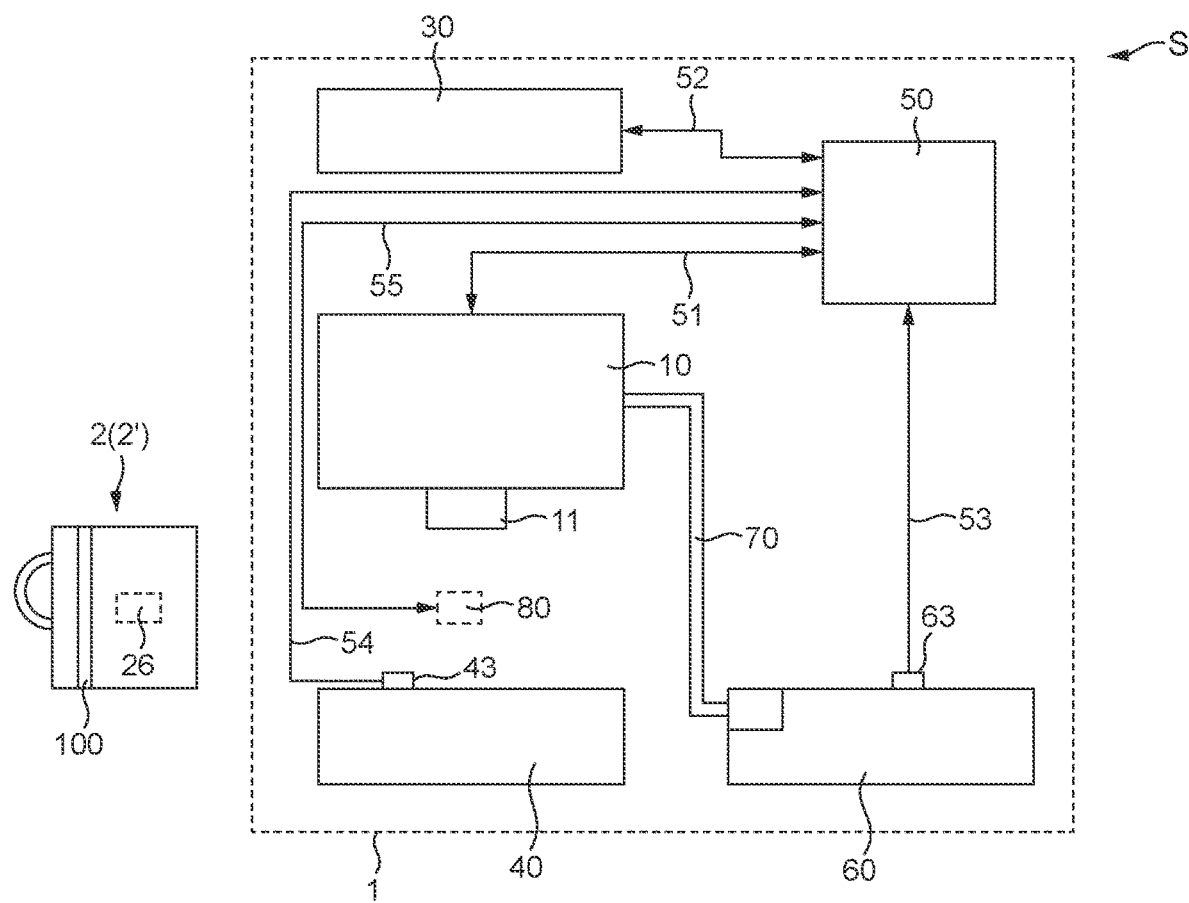
FIG. 4 shows a schematic functional view of the beverage production system according to the present invention.

With respect to FIG. 4, the beverage production machine 1 comprises a beverage production unit 10 for preparing and dispensing a comestible/beverage. The beverage production unit 10 can comprise a capsule receiving chamber for example, for receiving a capsule comprising, for instance, coffee powder to be extracted. The beverage production unit 10 may further comprise a liquid pump to provide pressurized liquid to the beverage production unit 10, e.g. the capsule receiving chamber. The beverage production unit 10 may further comprise a beverage outlet 11 for dispensing the produced/extracted beverage. The beverage production unit 10 can also comprise a milk reservoir and thus will be able to deliver milk to the container 2. Furthermore, the beverage production unit 10 can also provide for example milk foam.

The beverage production machine 1 further comprises a control unit 50 for controlling the beverage production of the beverage production unit 10, according to the one or plurality of levels set by the user on the sensor 100. Therefore, the control unit 50 and the beverage production unit 10 are connected by electrical connection 51. Moreover, the beverage production machine 10 may further comprise input and/or output means 30, like a (touch) panel, signal lights, a loud speaker for generating acoustic signals, and/or buttons for selecting and initiating beverage production programs. Therefore, the input/output means 30 are connected by electrical connection 52 with the control unit 50.

The beverage production machine 1 may further comprise a dripping tray 40 (which may also function as a drinking vessel receiving member) for receiving leaking liquid or liquid which is dispensed by the beverage production unit 10 for example during a cleaning program of the beverage production machine 1. For electrical connection of the beverage production machine 1, the beverage production machine 1 may further comprise a power cable 80.

The sensor 100 can be a conducting oxide deposition on a substrate: the conducting oxide of such a sensor 100 preferably is a transparent conducting oxide (TCO). Such a TCO is preferably an indium tin oxide (ITO) being electrically conductive and optically transparent and can be easily deposited as a thin film. Other alternatives to ITO are, for instance, aluminum zinc oxide (AZO), gallium zinc oxide (GZO), indium zinc oxide (IZO), indium cadmium oxide (ICO), antimony tin oxide (ATO), and fluorine tin oxide (FTO).

As a material for the substrate there is preferably used glass or a polymer. The glass and polymer are preferably transparent. As an example, polyethylene terephthalate (PET) is used as such a transparent polymer. To provide a thin film capacitive sensor 100, the substrate is provided as a thin strip (i.e. thin film) onto which the respective conducting oxide is deposited by corresponding deposition techniques.

The use of a transparent and preferably colorless sensor 100 has no or only a minor negative aesthetic effect (i.e. it is almost invisible) when being provided onto a corresponding liquid container 2. This is particularly true for transparent liquid containers 2 commonly used in the prior art.

To allow for an accurate measurement of the liquid filling level of the container 2, the sensor 100 can at least partially extend between a bottom portion 22 and a top portion 23 of the liquid container 2. In a preferred embodiment, the sensor 100 extends from the bottom 22 of the container 2 towards the top 23 of the container 2. In a preferred embodiment, the sensor 100 extends at least up to a maximum filling level 24 of the container 2 as can be seen in FIG. 1 or in FIG. 2. It should be understood that the maximum filling level 24 of the container 2 is typically below the top portion 23 of the container 2, in order to avoid any risk of overflowing, for example in typical cases where the consumer has introduced in the container ice cubes, for example, or food particles, already taking volume inside the container 2.

Preferably, the connection of the container 2 to the machine 1 is done by a wireless connection (Bluetooth or Wi-Fi), but it is also possible that the container 2 is electrically connected, according to another embodiment, to the machine 1. In this latter case, the sensor 100 may comprise an electric connection portion, for example a metallized portion such as a silver pad or the like which is in direct contact with the conducting oxide. The electric connection portion is preferably provided at a bottom portion 22 of the container 2 so that it can get in contact with a corresponding electric contact 63 of the beverage production machine 1 when being associated with—e.g. placed onto—the beverage production machine 1 and in particular on/in a corresponding liquid container receiving portion 60. The electric connection portion can be provided at any portion of the sensor 100 which faces and gets into electrical contact with a corresponding electric contact 63 of the beverage production machine 1 when the liquid container 2 is associated with (e.g. placed onto) the beverage production machine 1. The electric connection portion can also be provided by the oxide deposition of the sensor 100 itself. The electric contact 63 of the beverage production machine 1 is preferably electrically connected 53 with the control unit 50 as exemplarily shown in FIG. 4. Hence, the electrical contact 63 allows for electrically connecting the sensor 100 of the container 2 with the control unit 50 when the container 2 is associated with the machine 1.

More preferably, the connection of the container 2 to the machine 1 is done through a wireless connection portion like an RFID tag. This RFID tag is then preferably connected with the oxide deposition of the sensor 100 to receive the detected values of the sensor 100 to be provided for data transmission to an associated part of the machine 1 for measurement operation. Hence, the wireless connection portion can be used for wireless connection with the wireless transmission means for connecting the sensor 100, e.g. via data link, with the control unit 50 when the container 2 is associated with the beverage production machine 1 as already described herein above.

The sensor 100 can be provided along the outer surface or at least partially within a sidewall of the container 2. In the latter case, the sensor 100 can be integrated within the (sidewall of the) container 2 when producing the container 2, e.g., by an injection molding process. Alternatively, when providing the sensor 100 along an outside surface of the container 2, the sensor 100 can be attached onto the container 2, e.g., by being glued or welded. In the container of the invention, the level sensor and the settable device are electrically isolated from each other configured in such a way that their measurements are not influenced.

The thin film capacitive sensor 100 of the present invention preferably forms one pole of a capacitor of the beverage production machine 1 and preferably a capacitor of the container 2. In a preferred embodiment, the container 2 can be made of a dielectric material so that the thin film capacitive sensor 100 and the container 2 form the capacitor in combination with the liquid (receiving) chamber 20 not, partially or completely filled with a corresponding liquid, like water. Due to the filling level of the liquid in the container 2, the capacity being detected by the sensor 100 changes from which then the filling level can be directly derived, e.g. by the control unit 50.

The control unit 50 is thus configured to control the beverage production based on the liquid filling level of the container 2 detected over time by the sensor 100. The beverage production and the type of it can thus be controlled based on the result of the liquid filling level or liquid flow rate of the liquid dispensed to the liquid container 2. Therefore, the beverage production machine 1 or system S according to the present invention allows for beverage production control simply based on the result of the liquid filling level detected by the thin film capacitive sensor 100 of the present invention replacing commonly used liquid level floats and/or flowmeters commonly used in the prior art. The sensor elements can thus be simplified resulting in a more economic and aesthetic beverage production machine 1 or system S and liquid container 2.

The liquid filling level detected by the sensor 100 in the container (drinking vessel 2') can be used as an overflow protection. For instance, the beverage production of the beverage production unit 10 of the beverage production machine 1 can be stopped, e.g. by the control unit 50 of the beverage production machine 1, when a predefined maximum filling level of the drinking vessel 2' has been reached and is detected by the sensor 100. The sensor 100 can be electrically connected to a corresponding electric contact 43, e.g., via an electric connection portion of the sensor 100, and is preferably also connected by electrical connection 54 to the control unit 10. Alternatively, instead of the electric connection portion and electric contact 43, the drinking vessel 2' will preferably comprise a wireless connection portion (e.g. RFID tag) and the beverage production machine 1 will comprise a wireless transmission means for wireless data link and transmission. To allow for a correct positioning of the connection members and thus a secure connection of the sensor 100 with the electric contact 43 or wireless transmission means, the beverage production system S, preferably the drinking vessel receiving member 40 on the one side and the drinking vessel 2' on the other side, may comprise corresponding mechanical coding means to allow for a unique positioning/orientation of the drinking vessel 2' with respect to the beverage production machine 1 and particularly the electric contact 43 or wireless transmission means.

The control unit 50 might be configured such that it interrupts or does not initiate beverage production by the beverage production unit 10 or at least outputs a signal via the output means 30 when it does not detect a contact with a corresponding sensor 100 via the respective electric contacts 43, 63 or a connection with a corresponding sensor 100—or better its wireless connection portion (e.g. RFID tag)—via the respective wireless transmission means.

The liquid container 2 (drinking vessel 2') may further comprise an RFID tag 26 or the like comprising data like the maximum filling level and volume of the drinking vessel 2' and corresponding capacity values regarding the respective filling levels. The RFID tag 26 can be identical with the RFID tag being provided as wireless connection portion as described herein above. The mentioned data can be received by using a corresponding reader of the beverage production machine 1 being connected by electrical connection 55 to the control unit 50 corresponding for beverage production control. This reader can be identical with the wireless transmission means as described herein above. For instance, beverage production can be stopped once a defined maximum filling level of the drinking vessel 2'—being stored in the RFID tag 26 and detected by the sensor 100—has been reached.

In the following, a method for setting one or a plurality of liquid filling levels of a container 2 will be described.

In a first step of said method, a beverage production system S according to the present invention—i.e. having the beverage production machine 1 and the liquid container 2—is provided.

In a second step, the container 2 according to the present invention is associated with the beverage production machine 1 such that the sensor 100 of the container 2 is connected with the control unit 50, typically via the wireless transmission means of the beverage production machine 1 (alternatively, via the electrical contact 43, 63).

In a third step of the method, the beverage production is controlled based on the liquid filling level of the container 2 detected by the sensor 100 over time. Depending on the one or more settings of liquid filling levels in the container 2, of one or more liquids, the machine 1 will deliver different volumes of said liquids (for example coffee, milk, foam, etc.) and the sensor will measure over time when these liquid filling levels of the different liquids have been reached so as to provide the final beverage as desired and set by the user.

In a preferred embodiment, the control unit 50 controls the beverage production based on the flow rate derived from the change of the liquid filling level of the container 2 detected by the sensor 100 during the beverage production; i.e. detected over time, for the one or plurality of liquids delivered in the container 2. The liquid filling level of the container 2 can, for instance, be detected a plurality of times during beverage production, even for the same liquid (only one) provided in the container. The control unit 50 can then directly derive the actual flow rate of the liquid. The measured actual flow rate can then be used for control of the beverage production or the beverage production machine 1. For instance, a required liquid flow rate can be controlled based on the actual flow rate. Moreover, malfunction of the beverage production machine 1 can be detected if the actual flow rate deviates from a (pre-defined) target flow rate by a (pre-defined) amount. Hence, scale or clogging or malfunction of a liquid pump can be indirectly detected. This is a further and important advantage of the container of the invention, as the sensor 100 itself can be used as flowmeter, and the system S does not need to comprise a machine 1 with a flowmeter.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A method for setting one or a plurality of liquid filling levels of a container, the method comprising:
   providing a beverage production system comprising a beverage production machine, the beverage production machine comprising a beverage production unit for preparing and dispensing a beverage, the beverage production machine further comprising a control unit for controlling a beverage production by the beverage production unit, the beverage production system further comprising a container for receiving one or more liquids, the container comprising a thin film capacitive sensor comprising a level sensor for detecting a liquid filling level of the container over time, wherein the thin film capacitive sensor further comprises a settable device allowing setting one or more desired liquid filling levels of the container, wherein the thin film capacitive sensor comprises (i) a conducting oxide deposition on a substrate and (ii) an external layer, the level sensor comprising the conducting oxide deposition on the substrate, and the settable device comprising the external layer, the one or more desired liquid filling levels being associated with the one or more liquids, wherein the thin film capacitive sensor of the container is connected with the control unit, when the container is associated with the beverage production machine; and the control unit is configured to control the beverage production based on the liquid filling level of the container over time detected by the level sensor and on the one or more desired liquid filling levels of the container set by the settable device of the one or more liquids, associating the container with the beverage production machine such that the thin film capacitive sensor of the container is connected with the control unit, controlling the beverage production based on the liquid filling level of the container over time detected by the level sensor and on the one or more desired liquid filling levels of the container set by the settable device, of the one or more liquids, and interrupting the beverage production when the thin film capacitive sensor of the container is disconnected from the control unit.

2. The method according to claim 1, wherein the control unit controls the beverage production based on a flow rate derived from a change of the liquid filling level of the container detected by the thin film capacitive sensor during the beverage production to reach a set level of the one or more liquids in the container, for each of the one or more desired liquid filling levels set through the settable device, for the one or more liquids.

3. The method according to claim 1, wherein the external layer of the thin film capacitive sensor is a touch screen positioned externally relative to the level sensor, and the level sensor and the settable device are electrically isolated from each other such that a measurement by the level sensor and a setting of the one or more desired liquid filling levels by the settable device are not influenced by each other.

4. The method according to claim 1, wherein the thin film capacitive sensor is flexible, at least partially extends between a bottom and a top of the container, and is configured to adopt an external shape of the container, and the thin film capacitive sensor comprises a wireless connection portion connecting the thin film capacitive sensor to the control unit for a measurement operation.

5. The method according to claim 1, comprising connecting the thin film capacitive sensor of the container to the control unit by a wireless transmission member comprising an RFID reader configured for connection with an RFID tag of the container.

6. The method according to claim 1, wherein the container comprises a dielectric material, wherein the thin film capacitive sensor is a pole of a capacitor, and wherein the one or more liquids in the container forms a dielectric of the capacitor.

7. The method according to claim 1, wherein the thin film capacitive sensor is located along an outer surface or at least partially within a sidewall of the container.

* * * * *